United States Patent [19]

Goff et al.

[11] 4,164,892
[45] Aug. 21, 1979

[54] CONTROL APPARATUS

[75] Inventors: Raymon L. Goff, Wooster, Ohio; Jim L. Rau, Lafayette, Ind.

[73] Assignee: TRW Inc., Cleveland, Ohio

[21] Appl. No.: 753,589

[22] Filed: Dec. 22, 1976

[51] Int. Cl.$^2$ ............................................. F15B 9/10
[52] U.S. Cl. .................................... 91/375 A; 91/536
[58] Field of Search ............... 91/375 A, 413, 375 R, 91/179

[56] References Cited

U.S. PATENT DOCUMENTS

| 2,853,102 | 9/1958 | Walker | 91/413 |
| 2,910,971 | 11/1959 | MacDuff | 91/384 |
| 3,465,842 | 9/1969 | Hruska | 91/375 A |
| 3,834,278 | 9/1974 | Gaff et al. | 91/413 |
| 3,996,838 | 12/1976 | Goff | 91/413 |

FOREIGN PATENT DOCUMENTS 1201174  7/1959  France ..................... 91/413

Primary Examiner—Paul E. Maslousky

[57] ABSTRACT

An improved control apparatus is utilized in a vehicle which has a single pump for supplying fluid to effect turning movement of steerable wheels and operation of an auxiliary apparatus. The control apparatus includes a housing in which a piston is movable in a cylinder under the influence of fluid pressure to effect turning movement of the steerable wheels. A valve assembly is disposed in the same housing. The valve assembly is operable between an unactuated condition in which fluid flow from a pump is directed to the auxiliary apparatus and either one of two actuated conditions in which fluid flow from the pump is directed to an end portion of the cylinder to effect movement of the piston and turning of the vehicle wheels. The valve assembly includes a rotatable sleeve member which is disposed in the valve chamber and defines a plurality of ports disposed in a circular array. A rotatable valve member is disposed within the sleeve member and cooperates with the circular array of ports to direct fluid under pressure from the pump to either the auxiliary apparatus or to the cylinder in which the piston is disposed to effect turning movement of the vehicle wheels.

6 Claims, 4 Drawing Figures

CONTROL APPARATUS

BACKGROUND OF THE INVENTION

The present invention relates to an improved control apparatus and more specifically to an apparatus which is used in association with a single pump which supplies fluid to both a vehicle steering apparatus and an auxiliary apparatus.

A control apparatus which is utilized in association with a single pump to direct fluid to an auxiliary apparatus and a steering apparatus is disclosed in U.S. Pat. No. 3,834,278. The control apparatus disclosed in this patent includes a valve assembly having a housing in which a valve chamber is formed. A valve member is movable axially relative to a plurality of stationary grooves which are formed in the housing. When the valve member is in a neutral position, fluid can flow from the grooves in the valve housing to an auxiliary apparatus. Upon initiation of a steering operation, the valve member is shifted axially in either one of two directions and fluid flow from the pump is directed to a power steering motor. The control valve assembly utilized in the apparatus disclosed in this patent is spaced apart from the power steering motor.

Another control apparatus which is utilized in connection with a vehicle having a single pump for supplying fluid to effect steering movement of vehicle wheels and operation of an auxiliary apparatus is disclosed in U.S. Pat. No. 2,910,971. The apparatus disclosed in this patent includes an axially shiftable control valve which is disposed in a valve housing. Upon actuation of the control valve, fluid pressure to an auxiliary motor may be shut off and fluid is ported to a power steering motor spaced some distance from the valve housing.

Power steering assemblies for effecting turning movement of steerable vehicle wheels are disclosed in U.S. Pat. Nos. 3,606,819 and 3,935,790. The valves are used in association with power steering motors and are not adapted to control the flow of fluid from a single pump to both a power steering motor and to an auxiliary apparatus.

SUMMARY OF THE PRESENT INVENTION

The present invention provides a compact control apparatus which can be fitted into a cramped engine compartment of a vehicle in association with a single pump which supplies fluid to effect both turning movement of steerable wheels and operation of an auxiliary apparatus. This compact construction is obtained by utilizing a single housing to enclose both a power steering motor and a valve assembly for controlling the flow of fluid to the power steering motor and to the auxiliary apparatus. The valve assembly includes a rotatable valve member which is held against axial movement and is rotatable from an initial position to anyone of a plurality of actuated positions. This valve member cooperates with a rotatable sleeve in which a plurality of ports are formed in a circular array.

When the valve member is in an initial condition, fluid from the pump is directed to a pair of ports which are connected with the auxiliary apparatus. Upon initiation of a steering operation, the valve member is rotated relative to the sleeve to an actuated position in which fluid pressure from the pump is directed to a power steering motor disposed in the housing for the valve assembly. As the power steering motor is actuated, a feedback apparatus in the valve and motor housing effects rotation of the sleeve with the valve member. When the power steering motor has been actuated to an extent corresponding to the extent of rotation of a steering wheel or other input member, the feedback apparatus rotates the sleeve relative to the valve member to return the valve member and ports in the sleeve to their original or initial positions relative to each other.

A plurality of diametrically opposite pairs of fluid pressure inlet ports are advantageously associated with a single pair of ports connected with the auxiliary apparatus so that a fluid inlet port can be disposed on each side of each port of the pair of ports connected with the auxiliary apparatus. In addition, the sleeve is advantageously provided with a pair of diametrically opposite ports which are connected with a variable volume chamber in the power steering motor. Fluid is ported along a central passage formed in the valve member and the feedback apparatus to a second variable volume chamber in the power steering motor.

Accordingly, it is an object of this invention to provide a new and improved control apparatus for use in a vehicle having a single pump to supply fluid to effect turning movement of steerable wheels and operation of an auxiliary apparatus and wherein the control apparatus includes a rotatable valve which is disposed in a housing with a power steering motor and is rotatable between an initial position in which the valve is effective to direct fluid flow to the auxiliary apparatus and a plurality of actuated positions to block fluid flow to the auxiliary apparatus and direct fluid flow to the power steering motor.

Another object of this invention is to provide a new and improved control apparatus which is utilized in a vehicle having a single pump to supply fluid to effect turning movement of steerable wheels and operation of an auxiliary apparatus and wherein the control apparatus includes a rotatable sleeve member and a rotatable valve member, the valve member being rotatable relative to the sleeve member from an initial condition directing fluid flow to the auxiliary apparatus to an actuated condition in which the fluid flow from the pump is directed to a power steering motor.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
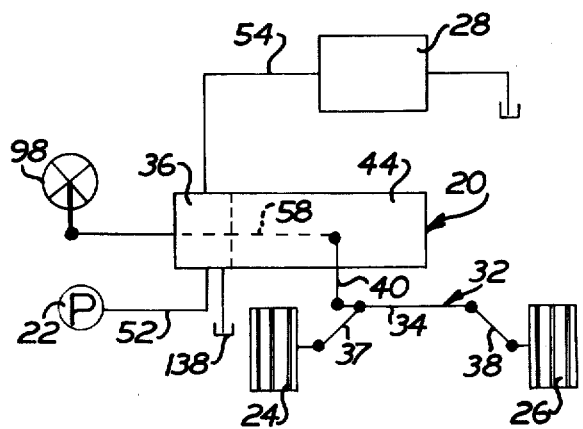
FIG. 1 is a schematic illustration of a control apparatus constructed in accordance with the present invention.

An improved control apparatus 20 is illustrated schematically in FIG. 1 in association with a single pump 22 which supplies fluid to effect turning movement of steerable vehicle wheels 24, 26 and operation of an auxiliary apparatus indicated schematically at 28. The auxiliary apparatus may be a winch, brakes, or any other desired implement which is actuated under the influence of fluid pressure. The control apparatus 20 is connected with the steerable vehicle wheels by a known steering linkage 32 which includes a centerlink 34 connected with the wheels 24 and 26 by a pair of tie rods 37 and 38. The control apparatus 20 is effective to pivot a pitman arm 40 which is pivotally connected with the centerlink 34 to actuate the steering linkage 32 to turn the vehicle wheels in a known manner.

The control apparatus 20 includes a power steering motor 44 and a valve assembly 36. The valve assembly 36 and power steering motor 44 have a common housing assembly 48 (see FIG. 2). By providing a common housing assembly 48 for both the power steering motor 44 and the valve assembly 36, the control apparatus 20 is provided with a relatively compact construction so that it can be mounted within the crowded engine compartment of a vehicle.

The valve assembly 36 (FIG. 1) is connected in fluid communication with the pump 22 by a fluid passage or conduit 52. Similarly, the valve assembly 36 is connected in fluid communication with the auxiliary apparatus 28 by a fluid passage or conduit 54. The valve assembly 36 is connected in fluid communication with the power steering motor 44 by passages or conduits enclosed within the housing 48 and indicated schematically at 58 in FIG. 1.

The power steering motor 44 (FIG. 2) includes a generally cylindrical piston 62 which is disposed in a cylindrical main chamber 64. The piston 62 is effective to divide the cylinder 64 into a pair of variable volume chambers, that is a first or upper chamber 68 disposed at one end of the piston 62 and a second or lower chamber 70 disposed at the opposite end of the piston. The piston 62 is provided with gear teeth which form a rack gear 74 which is disposed in meshing engagement with an arcuate sector gear 76. The sector gear 76 is integrally formed with a cross or output shaft 78. The cross or output shaft 78 is connected with the pitman arm 40 in a known manner to effect pivotal movement of the pitman arm under the influence of forces transmitted from the piston 62 to the output shaft 78 upon axial movement of the piston 62 in the housing 48. The compact construction of the control apparatus 20 is promoted by locating the sector gear 76 in the housing assembly 48 with the piston 62 and the control valve assembly 36.

A feedback assembly 82 interconnects the piston 62 and the valve assembly 36. Upon axial movement of the piston 62 toward the right, as viewed in FIG. 2, under the influence of fluid pressure in the chamber 68, a plurality of balls 86 are effective to transmit drive forces from a helix 88 formed within the piston to a helix 90 formed on the outside of the rotatable worm member 92. These drive forces rotate the worm member 92 to actuate the valve assembly 36 to a closed condition when the piston 62 has moved to an extent corresponding to the extent of rotation of a steering wheel 98 (FIG. 1) connected with an input shaft 100 (FIG. 2) to the valve assembly 36. On axial movement of the piston 62 toward the left (as viewed in FIG. 2), the balls 86 are likewise effective to actuate the valve to a closed condition.

Figure 2:
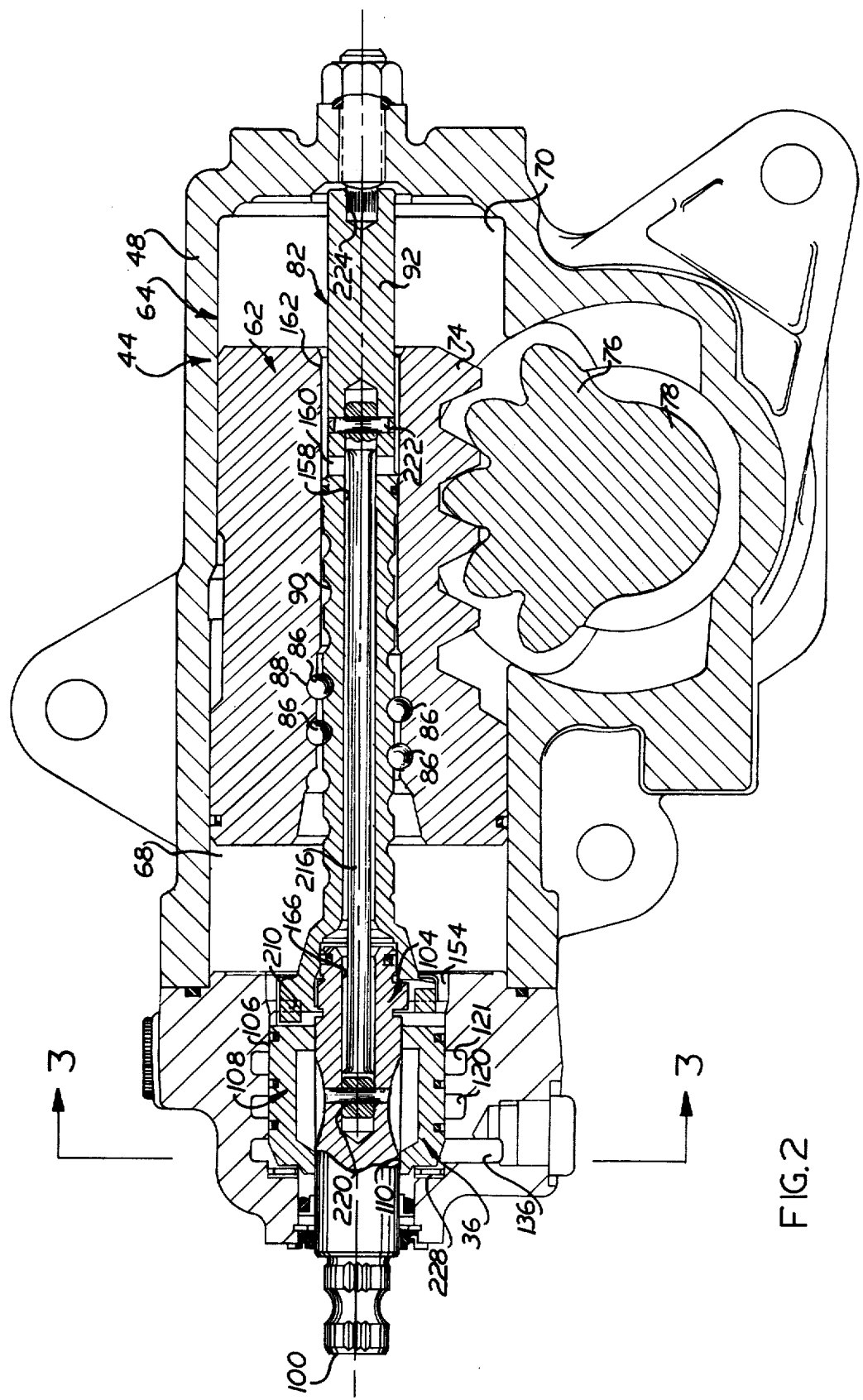
FIG. 2 is a sectional view of a portion of the control apparatus of FIG. 1 and illustrating a power steering motor and fluid flow control valve assembly disposed in a common housing.

The valve assembly 36 includes a rotatable valve member 104 which is disposed in and is coaxial with a generally cylindrical valve chamber 106 in the housing 48 (see FIG. 2). The valve member 104 is enclosed by a generally cylindrical sleeve 108 which also is coaxial with the valve chamber 106. A plurality of ports are formed in a circular array in a cylindrical inner surface 110 on the valve sleeve. The rotatable valve member 104 cooperates with the rotatable sleeve 108 to direct high pressure fluid from the pump 22 (see FIG. 1) to the auxiliary apparatus 28 when the power steering motor 44 is inactive. Upon initiation of a steering operation by rotation of the steering wheel 98, the valve member 104 is rotated relative to the ports in the coaxial sleeve 108 to block fluid flow to the auxiliary apparatus 28 and to direct fluid flow to the power steering motor 44. Of course, the fluid pressure directed to the power steering motor 44 causes it to rotate the output shaft 78 to effect actuation of the steering linkage 32 to turn the vehicle steering wheels 24 and 26 in a known manner.

The rotatable valve member 104 is provided with a plurality of longitudinally extending lands (see FIG. 3) which cooperate with the ports in the sleeve 108 to control the flow of fluid from the single pump for both the auxiliary apparatus and the power steering motor. Thus, the rotatable valve member 104 is provided with a pair of diametrically opposite longitudinally extending lands 112 and 114 which cooperate with a pair of diametrically opposite ports 116 and 118 formed in the sleeve 108. The ports 116 and 118 are connected in fluid communication with the auxiliary apparatus 28 through an annular housing groove 120 (FIG. 2) which circumscribes the valve sleeve 108 and is connected with the conduit 54 (FIG. 1).

High pressure fluid is supplied from the pump 22 (FIG. 1) through the conduit 52 to an annular housing groove 121 (FIG. 2). The housing groove 121 is connected with a first pair of diametrically opposite inlet ports 122 and 124 (FIG. 3) and to a second pair of diametrically opposite inlet ports 126 and 128. The inlet ports 122, 124, 126 and 128 in the sleeve member 108 are disposed adjacent opposite sides of the ports 116 and 118.

The lands 112 and 114 (FIG. 3) on the valve member 108 have a width which is less than the width of the ports 116 and 118. When the valve member 108 is in the unactuated position of FIG. 3, fluid can flow to the port 116 leading to the auxiliary apparatus from the inlet ports 122 and 126 in the manner illustrated schematically by the arrows in FIG. 3. Fluid can also flow to the port 118 leading to the auxiliary apparatus from the inlet ports 124 and 128. This enables the auxiliary apparatus to be operated when the power steering motor 44 is not demanding fluid.

Figure 3:
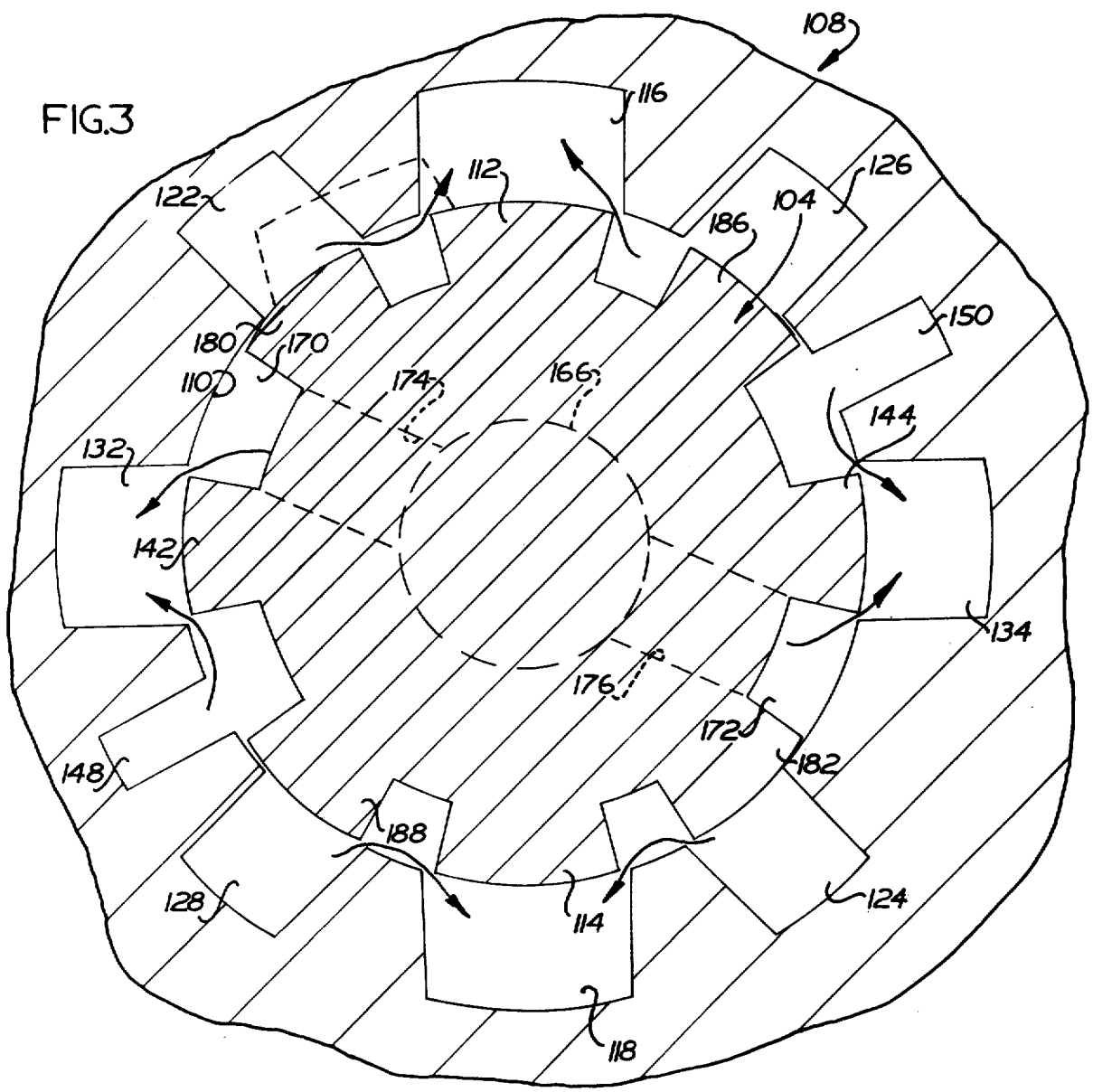
FIG. 3 is a fragmentary sectional view shown on an enlarged scale and taken along the line 3—3 of FIG. 2, and illustrating the relationship of a rotatable valve member to a plurality of ports formed in a rotatable sleeve when the valve member is in an initial position directing fluid flow from a pump to an auxiliary apparatus.

When the rotatable valve member 104 is in the initial or unactuated position illustrated in FIG. 3, the variable volume chambers 68 and 70 in the power steering motor 44 are connected in fluid communication with return or drain ports. Thus, a pair of diametrically opposite fluid return ports 132 and 134 formed in the sleeve member 108 are connected with an annular housing groove 136 (FIG. 2). The groove 136 is connected with the reservoir which is indicated schematically at 138 in FIG. 1. At this time a pair of longitudinally extending lands 142 and 144 (FIG. 3) on the rotatable valve member 104 are centrally disposed between opposite side edge portions of the fluid return ports 132 and 134. This enables fluid to flow from a pair of diametrically opposite motor ports 148 and 150 formed in the sleeve member 108 to the fluid return ports 132 and 134 in the manner indicated schematically by the arrows in FIG. 3.

The motor ports 148 and 150 are connected with the variable volume chamber 68 by a fluid passage 154 (see FIG. 2). The opposite variable volume chamber 70 is connected in fluid communication with the return ports 132 and 134 (FIG. 3) by a fluid passage 158 extending axially through the worm member 92 (see FIG. 2). The right end (as viewed in FIG. 2) of the passage 158 is connected with a cross passage 160 and the chamber 70 through the bore 162 of the piston 62. The opposite end of the passage 158 in the worm 92 is connected in fluid communication with a central passage 166 formed in the rotatable valve member 104. The passage 166 is connected in fluid communication with a pair of longitudinally extending grooves 170 and 172 (see FIG. 3) formed in diametrically opposite sides of the rotatable valve member 104. The grooves 170 and 172 are connected in fluid communication with each other and with the central passage 166 by passages 174 and 176. When the valve member 104 is in the unactuated position illustrated in FIG. 3, fluid can flow from the grooves 170 and 172 which are connected in fluid communication with a variable volume chamber 70 to the fluid return ports 132 and 134 in the sleeve 108 in the manner illustrated schematically by the arrows in FIG. 3.

When the valve member 104 is in the unactuated condition of FIG. 3, fluid flow from the inlet ports 122, 124, 126 and 128 to the variable volume chambers 68 and 70 is blocked by longitudinally extending lands on the valve member 104. Thus, a pair of diametrically opposite lands 180 and 182 on the valve member 104 block fluid flow from the inlet ports 122 and 124 to the passages 174 and 176 leading to the variable volume chamber 70. Similarly, a pair of diametrically opposite lands 186 and 188 on the valve member 104 block fluid flow from the inlet ports 126 and 128 to the ports 148 and 150 connected with the variable volume chamber 68. Thus, when the rotatable valve member 104 is disposed in the initial or unactuated position of FIG. 3 all of the high pressure fluid from the pump 22 is directed to the ports 116 and 118 connected with the auxiliary apparatus 28 and fluid flow from the pump to the power steering motor 44 is blocked.

Figure 4:
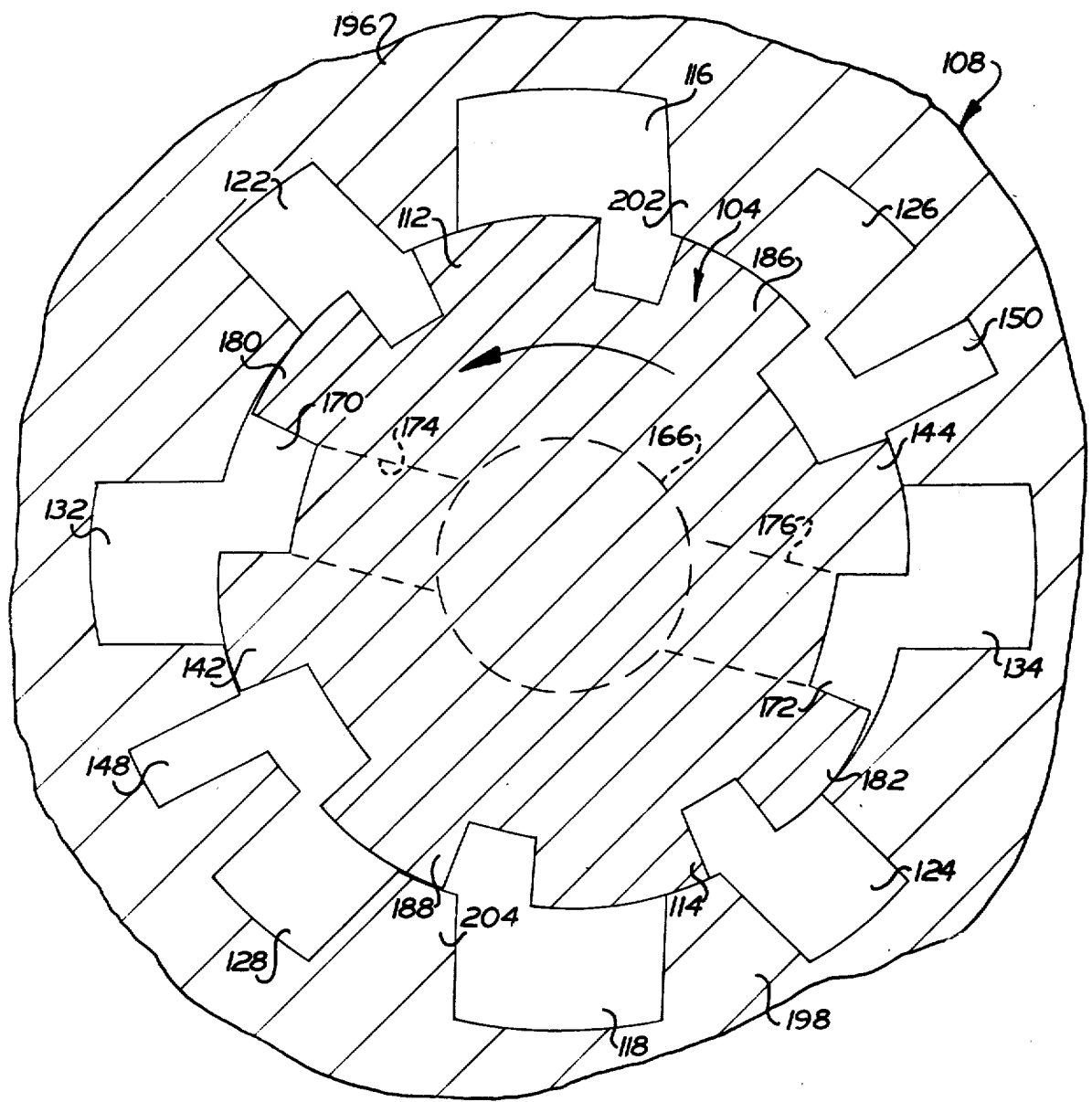
FIG. 4 is an enlarged fragmentary sectional view, similar to FIG. 3, illustrating the valve member after it has been rotated relative to the sleeve to a position blocking fluid flow from the pump to the auxiliary apparatus and directing fluid flow to the power steering motor of FIG. 2.

Upon initiation of a steering operation, the valve member 104 is rotated relative to the coaxial circular array of ports in the sleeve member 108 to block fluid flow to the auxiliary apparatus and to direct fluid flow to one of the variable volume chambers 68 or 70 in the power steering motor 44 and to connect the other variable volume chamber with drain. Thus upon rotation of the steering wheel 98 (FIG. 1) to turn to the left, the input shaft 100 (FIG. 2) to the control apparatus 20 is rotated in a counterclockwise direction. This rotates the valve member 104 counterclockwise from the initial position illustrated in FIG. 3 to a first actuated position illustrated in FIG. 4. As this occurs, the lands 112 and 114 on the valve member 104 move into sealing engagement with lands 196 and 198 on the sleeve 108 to block fluid flow from the fluid pressure inlet ports 122 and 124 to the ports 116 and 118 connected with the auxiliary apparatus 28. Similarly, the lands 186 and 188 on the valve member 104 engage lands 202 and 204 on the sleeve 108 to block fluid flow from the inlets 126 and 128 to the ports 116 and 118.

When the fluid flow to the ports 116 and 118 has been blocked, all of the output from the pump 22 is directed from the inlet ports 126 and 128 in the sleeve 108 to the motor ports 148 and 150. The motor ports 148 and 150 are connected in fluid communication with the variable chamber 68 for power steering motor 44 through the passage 154 (FIG. 2). The opposite variable volume chamber 70 is connected with the drain or return ports 132 and 134 (see FIG. 4) in the sleeve 108 through the passages 174 and 176 which are connected in fluid communication with the central passage 166 formed in the valve member 104 and the central passage 158 formed in the worm 92 (see FIG. 2).

The high pressure fluid in the variable volume chamber 68 urges the piston 62 toward the right (as viewed in FIG. 2). As the piston 62 moves toward the right, the rack gear 74 rotates the sector gear 76 in a clockwise direction to effect a leftward turning movement of the steerable vehicle wheels.

At this time, the feedback apparatus 82 (FIG. 2) is effective to rotate the sleeve 108 with the valve member. Thus, the balls 86 cooperate with the helix 90 formed in the worm 92 to effect rotation of the worm. The leftward (as viewed in FIG. 2) end portion of the worm 92 is connected with the valve sleeve 108 by suitable lugs indicated at 210. This causes the sleeve member 108 to rotate in a counterclockwise direction (as viewed in FIG. 4). Since the valve member 104 is also being rotated in a counterclockwise direction by the input shaft 100, the sleeve 108 and valve member 104 rotate together as the input shaft 100 is rotated and the piston 62 moves axially in the cylinder 64 (see FIG. 2). During this simultaneous rotation, the valve member 104 does not move relative to the sleeve 108 and the valve member remains in the actuated position of FIG. 4.

Upon interruption of rotational movement of the steering wheel and input member 100 at the completion of a turn, the valve member 104 ceases to rotate. At this time, the valve member 104 is in the position shown in FIG. 4 relative to the sleeve member 108. Therefore, fluid pressure continues to be ported to the variable volume chamber 68 to effect continued movement of the piston 62. This continued movement of the piston 62 causes feedback apparatus 82 to continue to rotate the sleeve 108 in a counterclockwise direction relative to the valve member 104 until the ports in the sleeve are in the initial position illustrated in FIG. 3 relative to the lands on the valve member. The fluid output from the pump 22 is then again ported to the auxiliary apparatus 28 and fluid flow from the pump to the power steering motor 44 is blocked to thereby interrupt operation of the power steering motor upon completion of a turn.

Of course upon rotation of the input member 100 in a clockwise direction to effect a right-hand turn, the valve member 104 is rotated in a clockwise direction from the initial position from FIG. 3 relative to the sleeve 108. This connects the fluid inlet ports 122 and 124 in fluid communication with the variable volume chamber 70 to effect movement of the piston 62 toward the left (as viewed in FIG. 2). When the piston 62 is moved toward the left, the balls 86 cooperate with the helical worm 90 to rotate the worm shaft 92 and valve member 108. This causes the valve member 108 to rotate in a clockwise direction as viewed in FIG. 3. Upon interruption of turning movement of the valve member 104, the sleeve 108 continues to rotate in a clockwise direction (as viewed in FIG. 3) to return the sleeve and valve members to the initial condition illustrated in FIG. 3.

A torsion bar 216 (see FIG. 2) is connected at one end with the valve member 104 and at its opposite end with the worm member 92. The torsion bar 216 is resiliently deflected upon initial turning movement of the valve member 104 relative to the sleeve 108 to store energy for effecting movement of the valve member 104 back to the initial position illustrated in FIG. 3 upon interruption of a steering operation.

The valve member 104 is held against axial movement relative to the housing 48 by a connection 220 with the torsion bar 216. The torsion bar is connected at 222 with the worm 92. The right end of the worm 92 (as viewed in FIG. 2) abuts a pivot connection 224 with the housing 48. The left end of the worm 92 abuts the sleeve 108 which in turn abuts a thrust bearing 228. Thus, the sleeve 108 and worm 92 are held against axial movement relative to the housing 48 by the bearing 228 and pivot connection 224. Since the torsion bar 216 is firmly anchored to the worm 92 and valve member 108, the valve member 108 can only be rotated in the valve chamber 106 and can not be shifted axially.

In view of the foregoing it is apparent that the control apparatus 20 has a compact construction which is obtained by utilizing a single housing 48 to enclose both a power steering motor 44 and a valve assembly 36 for controlling the flow of fluid to the power steering motor and to the auxiliary apparatus 28. The valve assembly 36 includes a rotatable valve member 104 which is held against axial movement and is rotatable from an initial position to anyone of a plurality of actuated positions. The valve member 104 cooperates with a rotatable sleeve 108 in which a plurality of ports are formed in a circular array.

When the valve member 104 is in an initial condition, fluid from the pump 22 is directed to a pair of ports 116 and 118 which are connected with the auxiliary apparatus 28. Upon initiation of a steering operation, the valve member 104 is rotated relative to the sleeve 108 to an actuated position (FIG. 4) in which fluid pressure from the pump 22 is directed to a power steering motor 44 disposed in the housing 48, with the valve assembly 36. As the power steering motor 44 is actuated, a feedback apparatus 82 in the valve and motor housing 48 effects rotation of the sleeve 108 with the valve member 104. When the power steering motor 44 has been actuated to an extent corresponding to the extent of rotation of a steering wheel 98 or other input member, the feedback apparatus 82 rotates the sleeve 108 relative to the valve member 104 to return the valve member and ports in the sleeve to their original or initial positions (FIG. 3) relative to each other.

A plurality of diametrically opposite pairs of fluid pressure inlet ports 122, 124, 126 and 128 are advantageously associated with a single pair of ports 116 and 118 connected with the auxiliary apparatus 28 so that a fluid inlet port can be disposed on each side of each port of the pair of ports connected with the auxiliary apparatus. Proper sequencing of the sleeve 108 inlet ports 122, 124, 126 and 128 to auxiliary ports 116 and 118 controlled by valve member 104 lands 180, 112, 186 and 188, 114, 182 establishes priority to the steering motor 44 function. In addition, the sleeve 108 is advantageously provided with a pair of diametrically opposite ports 148 and 150 which are connected with a variable volume chamber 68 in the power steering motor. Fluid is ported along central passages 166 and 158 formed in the valve member 104 and the feedback apparatus 82 to a second variable volume chamber 70 in the power steering motor 44.

Having described one specific preferred embodiment of the invention, the following is claimed:

1. Control apparatus for use in a vehicle having a single pump for supplying fluid to effect turning movement of steerable wheels and operation of an auxiliary apparatus, said control apparatus comprising a housing, a main chamber disposed within said housing, a movable piston disposed in said main chamber and dividing said main chamber into first and second variable volume chambers, a movable output member connected with said housing and steerable wheels, means disposed within said housing for transmitting drive forces from said piston to said output member to effect movement of said output member and turning of the steerable wheels upon movement of said piston, a generally cylindrical valve chamber disposed in said housing, a plurality of passage means for connecting said valve chamber in fluid communication with the pump, the auxiliary apparatus, said first variable volume chamber and said second variable volume chamber, a circular array of ports disposed about the central axis of and connected in fluid communication with the cylindrical valve chamber, said circular array of ports including a first plurality of ports connected in fluid communication with the one of said plurality of passage means connected in fluid communication with the pump, a second plurality of ports connected in fluid communication with the one of said plurality of passage means connected to fluid communication with the auxiliary apparatus, and a third plurality of ports connected in fluid communication with the one of said plurality of passage means connected in fluid communication with said first variable volume chamber, a rotatable valve member disposed in said valve chamber in a coaxial relationship with said circular array of ports, means for retaining said valve member against axial movement relative to said housing, a plurality of longitudinally extending land means formed on said valve member for cooperating with said circular array of ports to effect a variation in the fluid pressure in at least some of said passage means upon rotation of said valve member about the central axis of said valve chamber, said valve member being rotatable relative to said circular array of ports in a first direction from an initial position to a first actuated position relative to said circular array of ports and being rotatable relative to said circular array of ports in a second direction from the initial position to a second actuated position relative to said circular array of ports, said first plurality of ports being connected in fluid communication with said second plurality of ports when said valve member is in said initial position to enable fluid to flow from the pump to the auxiliary apparatus, said longitudinally extending land means on said valve member being effective to direct fluid flow from at least some of said first plurality of ports through said third plurality of ports to said passage means connected in fluid communication with said first variable volume chamber and to block fluid flow to said second plurality of ports upon rotation of said valve member to said first actuated position to provide fluid flow to said first variable volume chamber in preference to the auxiliary apparatus upon rotation of said valve member to said first actuated position, said longitudinally extending land means on said valve member being effective to direct fluid flow from at least one of said first plurality of ports to said passage means connected in fluid communication with said second variable volume chamber and to block fluid flow to said second plurality of ports upon rotation of said valve member to second actuated position to provide fluid flow to said second variable volume chamber in preference to the auxiliary apparatus upon rotation of said valve member to said second actuated position.

2. An apparatus as set forth in claim 1 further including a sleeve member disposed in said housing and circumscribing said valve member, said circular array of ports being formed in said sleeve member, rotatable input means for rotating said valve member relative to said housing to an extent corresponding to the extent of rotation of said input means, and feedback means disposed in said housing for rotating said sleeve member relative to said housing to an extent corresponding to the extent of movement of said piston in said cylinder, said feedback means being effective to rotate said sleeve member relative to said valve member to return said valve member to said initial position relative to said circular array of ports upon movement of said piston in said cylinder to an extent corresponding to the extent of rotation of said input means.

3. An apparatus as set forth in claim 2 wherein said feedback means includes a worm on which a helical convolution is formed, said worm being connected with at one end with said sleeve member for rotational movement therewith, said piston having a bore into which said worm extends, said bore having helical convolution, and means operatively interconnecting the helicies on said worm and piston for effecting rotation of said worm in response to movement of said piston in said cylinder.

4. Control apparatus for use in a vehicle having a single pump for supplying fluid to effect turning movement of steerable wheels and operation of an auxiliary apparatus, said control apparatus comprising power steering motor means for effecting turning movement of the steerable wheels, surface means defining a generally cylindrical valve chamber, a plurality of passage means connected in fluid communication with the pump, the auxiliary apparatus, and said power steering motor means, a rotatable sleeve member disposed in said valve chamber, said sleeve member having a cylindrical inner surface disposed in a coaxial relationship with said valve chamber, a circular array of ports disposed in the cylindrical inner surface of said sleeve member, said circular array of ports including a first plurality of ports connected in fluid communication with the one of said plurality of passage means connected in fluid communication with the pump, a second port connected in fluid communication with the one of said plurality of passage means connected in fluid communication with the auxiliary apparatus, and a third port connected in fluid communication with one of said plurality of passage means connected in fluid communication with said power steering motor means, a rotatable valve member disposed in said sleeve member in a coaxial relationship with said circular array of ports, means for retaining said valve member against axial movement relative to said sleeve member, rotatable input means for rotating said valve member relative to said sleeve member, a plurality of longitudinally extending land means formed on said valve member for cooperating with said circular array of ports to effect a variation in the fluid pressure in at least some of said passage means upon rotation of said valve member relative to said ports in said sleeve member, said valve member being rotatable relative to said circular array of ports in said sleeve member in a first direction from an initial position to a first actuated position to effect operation of said power steering motor means in one direction and being rotatable relative to said circular array of ports in said sleeve member in a second direction from the initial position to a second actuated position to effect operation of said power steering motor means in another direction opposite from said one direction, at least one of the ports of said first plurality of ports being connected in fluid communication with said second port when said valve member is in said initial position to enable fluid to flow from the pump to the auxiliary apparatus, said longitudinally extending land means on said valve member being effective to direct fluid flow from at least one of the ports of said first plurality of ports to said passage means connected in fluid communication with said power steering motor means and to block fluid to flow to said second port upon rotation of said valve member relative to said sleeve member to said first actuated position to provide fluid flow to said power steering motor means in preference to the auxiliary apparatus, and feedback means for rotating said sleeve member to an extent corresponding to the extent of operation of said power steering motor means, said feedback means being effective to rotate said sleeve relative to said valve member to return said valve member to said initial position relative to said circular array of ports upon operation of said power steering motor means to an extent corresponding to the extent of rotation of said input means.

5. Control apparatus as set forth in claim 4 wherein said power steering motor means includes a housing, a cylindrical chamber disposed within said housing, a movable piston disposed in said cylindrical chamber and dividing said cylindrical chamber into first and second variable volume chambers, a movable output member connected with said housing and steerable wheels, and means disposed within said housing for transmitting drive forces from said piston to said output member to effect movement of said output member and turning of the steerable wheels upon movement of said piston, said valve chamber being disposed in said housing.

6. An apparatus as set forth in claim 5 wherein said longitudinally extending land means on said valve member being effective to direct fluid flow from at least one of said first plurality of ports to said first variable volume chamber upon rotation of said valve member relative to said sleeve member to said first actuated position to effect movement of said piston in one direction in said cylindrical chamber, said longitudinally extending land means on said valve member being effective to direct fluid flow from at least one port of said first plurality of ports to said second variable volume chamber upon rotation of said valve member relative to said sleeve member to effect movement of said piston in another direction in said cylindrical chamber.

* * * * *